US 6,568,192 B2

(12) United States Patent
Akiyama et al.

(10) Patent No.: US 6,568,192 B2
(45) Date of Patent: *May 27, 2003

(54) GAS TURBINE, GAS TURBINE APPARATUS, AND REFRIGERANT COLLECTION METHOD FOR GAS TURBINE MOVING BLADES

(75) Inventors: Ryou Akiyama, Hitachi (JP); Shinya Marushima, Hitachinaka (JP); Manabu Matsumoto, Ibaraki-machi (JP); Tsuyoshi Takano, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/138,429

(22) Filed: May 6, 2002

(65) Prior Publication Data

US 2002/0124570 A1 Sep. 12, 2002

Related U.S. Application Data

(62) Division of application No. 09/644,770, filed on Aug. 24, 2000, now Pat. No. 6,405,538.

(30) Foreign Application Priority Data

Nov. 5, 1999 (JP) ............................................. 11-314727

(51) Int. Cl.[7] ............................ F02C 7/16; F02D 29/58; F01D 5/08
(52) U.S. Cl. ............................. 60/806; 415/115; 416/95
(58) Field of Search ................... 60/782, 806; 415/115; 416/95

(56) References Cited

U.S. PATENT DOCUMENTS

| 4,666,368 A | 5/1987 | Hook, Jr. et al. |
| 5,695,319 A | 12/1997 | Matsumoto et al. |
| 5,758,487 A | 6/1998 | Salt et al. |
| 5,782,076 A | 7/1998 | Huber et al. |
| 5,984,637 A | 11/1999 | Matsuo |
| 6,053,701 A | 4/2000 | Ichiryu et al. |
| 6,094,905 A | * 8/2000 | Fukuyama .................. 415/115 |
| 6,185,924 B1 | * 2/2001 | Matsumoto et al. .......... 60/806 |
| 6,370,866 B2 | * 4/2002 | Marushima et al. ........ 415/114 |
| 6,405,538 B1 | * 6/2002 | Akiyama et al. ............. 60/806 |

FOREIGN PATENT DOCUMENTS

| JP | 7-189739 | | 7/1995 |
| JP | 8-14064 | | 8/1996 |
| JP | 9-242563 | | 9/1997 |
| JP | 10-103004 | * | 4/1998 |
| JP | 10-220201 | * | 8/1998 |
| JP | 11-101131 | | 4/1999 |
| WO | WO 98/23851 | * | 6/1998 |

* cited by examiner

*Primary Examiner*—Ted Kim
(74) *Attorney, Agent, or Firm*—Mattingly, Stanger & Malur, P.C.

(57) ABSTRACT

A turbine rotor includes a plurality of moving blades having cooling paths through which a refrigerant flows inside, a plurality of wheels having the moving blades mounted in the outer periphery thereof and at least one spacer member installed between the wheels. The spacer member has a plurality of flow paths through which a refrigerant flows after cooling the moving blades. The plurality of flow paths have flow paths interconnecting to the cooling paths in the moving blades on a first wheel adjacent the spacer member and interconnecting to a space formed on a side wall surface with which a second wheel adjacent the spacer member and the spacer member are in contact.

5 Claims, 7 Drawing Sheets

GAS TURBINE, GAS TURBINE APPARATUS, AND REFRIGERANT COLLECTION METHOD FOR GAS TURBINE MOVING BLADES

This is a divisional application of Ser. No. 09/644,770, filed Aug. 24, 2000, now U.S. Pat. No. 6,405,538.

BACKGROUND OF THE INVENTION

The present invention relates to a gas turbine for cooling moving blades using a refrigerant, a gas turbine apparatus, and a refrigerant collection method for gas turbine moving blades.

The combustion temperature of a gas turbine has a tendency to increase year by year so as to increase the efficiency and particularly the moving blades which are exposed to combustion gas become high in temperature, so that it is necessary to let a refrigerant flow in them and cool them.

As a refrigerant, compressed air extracted from a compressor, vapor generated by exhaust heat of combustion gas or the like is used.

To improve the efficiency of a gas turbine, it is important to collect and use a refrigerant after cooling the moving blades of the turbine in addition to realization of a high combustion temperature. Therefore, the so-called closed circuit cooling structure that the refrigerant flowing path is a closed circuit, for example, as described in Japanese Patent Application Laid-Open 8-14064 is variously proposed.

The big problems of a gas turbine having such a closed circuit cooling structure are the stress due to centrifugal force caused by rotation of the gas turbine and the sealing property of the connection of the refrigerant flow paths installed in the configuration member of the moving blades and turbine rotor.

The reason for that the stress due to centrifugal force caused by rotation of the gas turbine comes into a problem is shown below.

The turbine rotor rotates at a very high speed round the center line of the turbine, so that remarkable stress due to the centrifugal force is generated in the outer periphery. Particularly the wheel has many moving blades in the outer periphery and the operating centrifugal force is extremely large, so that high strength is required. Generally, inside the configuration member of the turbine rotor, the refrigerant flow paths and others are installed and hence the configuration members are not uniform, so that the stress is concentrated at a specific part and there is the possibility that the strength decreases.

SUMMARY OF THE INVENTION

An object of the present invention is to provide a gas turbine requiring realization of high efficiency with increased combustion temperature which has high reliability on the stress due to the centrifugal force caused by rotation of the gas turbine and high efficiency.

A gas turbine according to the present invention has a turbine rotor which includes a plurality of moving blades having cooling paths through which a refrigerant flows inside, a plurality of wheels having the aforementioned moving blades in the outer periphery, and at least a spacer member to be installed between the neighboring wheels, wherein the spacer member has a plurality of flow paths through which a refrigerant after cooling the moving blades flows and the plurality of flow paths have the first flow paths interconnecting to the cooling paths installed in the moving blades on the first wheel neighboring with the spacer members and interconnecting to the first space formed on the side wall surface with which the second wheel neighboring with the spacer member and the spacer member is in contact and the second flow paths interconnecting to the cooling paths installed in the moving blades on the second wheel and interconnecting to the second space formed on the side wall surface with which the first wheel and the spacer member are in contact.

Further, a gas turbine apparatus according to the present invention has a turbine rotor which includes a plurality of moving blades having cooling paths through which a refrigerant flows inside, a plurality of wheels having the aforementioned moving blades in the outer periphery, and at least a spacer member to be installed between the neighboring wheels, a compressor, and a combustor, wherein the spacer member has a plurality of flow paths through which a refrigerant after cooling the moving blades flows and the plurality of flow paths have the first flow paths interconnecting to the cooling paths installed in the moving blades on the first wheel neighboring with the spacer member and interconnecting to the first space formed on the side wall surface with which the second wheel neighboring with the spacer member and the spacer member are in contact and the second flow paths interconnecting to the cooling paths installed in the moving blades on the second wheel and interconnecting to the second space formed on the side wall surface with which the first wheel and the spacer member are in contact, interconnect the first and second spaces and the combustion air flow paths supplied to the combustor to each other, supply compressed air extracted from the compressor to the moving blades cooling paths as a refrigerant so as to cool the moving blades, collect the refrigerant after cooling the moving blades via the first and second flow paths, and use it as combustion air of the combustor.

A refrigerant collection method for gas turbine moving blades according to the present invention is accomplished, in a gas turbine having a turbine rotor which includes a plurality of moving blades having cooling paths through which a refrigerant flows inside, a plurality of wheels having the aforementioned moving blades in the outer periphery, and at least a spacer member installed between the neighboring wheels, by that in the moving blades installed in the first wheel neighboring with the spacer member on the upstream side of gas flow, a refrigerant passing inside is introduced in from the upstream side of gas flow and introduced out on the downstream side of gas flow, and the refrigerant introduced out from the moving blades is introduced out and collected in the first cavity formed in the junction surface of the second wheel neighboring on the downstream side of gas flow of the spacer member and the spacer member via the first flow paths formed in the spacer member and in the moving blades installed in the second wheel, a refrigerant passing inside is introduced in from the downstream side of gas flow and introduced out on the upstream side of gas flow, and the refrigerant introduced out from the moving blades is introduced out and collected in the second cavity formed in the junction surface of the first wheel and the spacer member via the second flow paths formed in the spacer member.

DESCRIPTION OF EMBODIMENTS OF THE INVENTION

The embodiments of the present invention will be explained hereunder with reference to the accompanying drawings.

Figure 1:
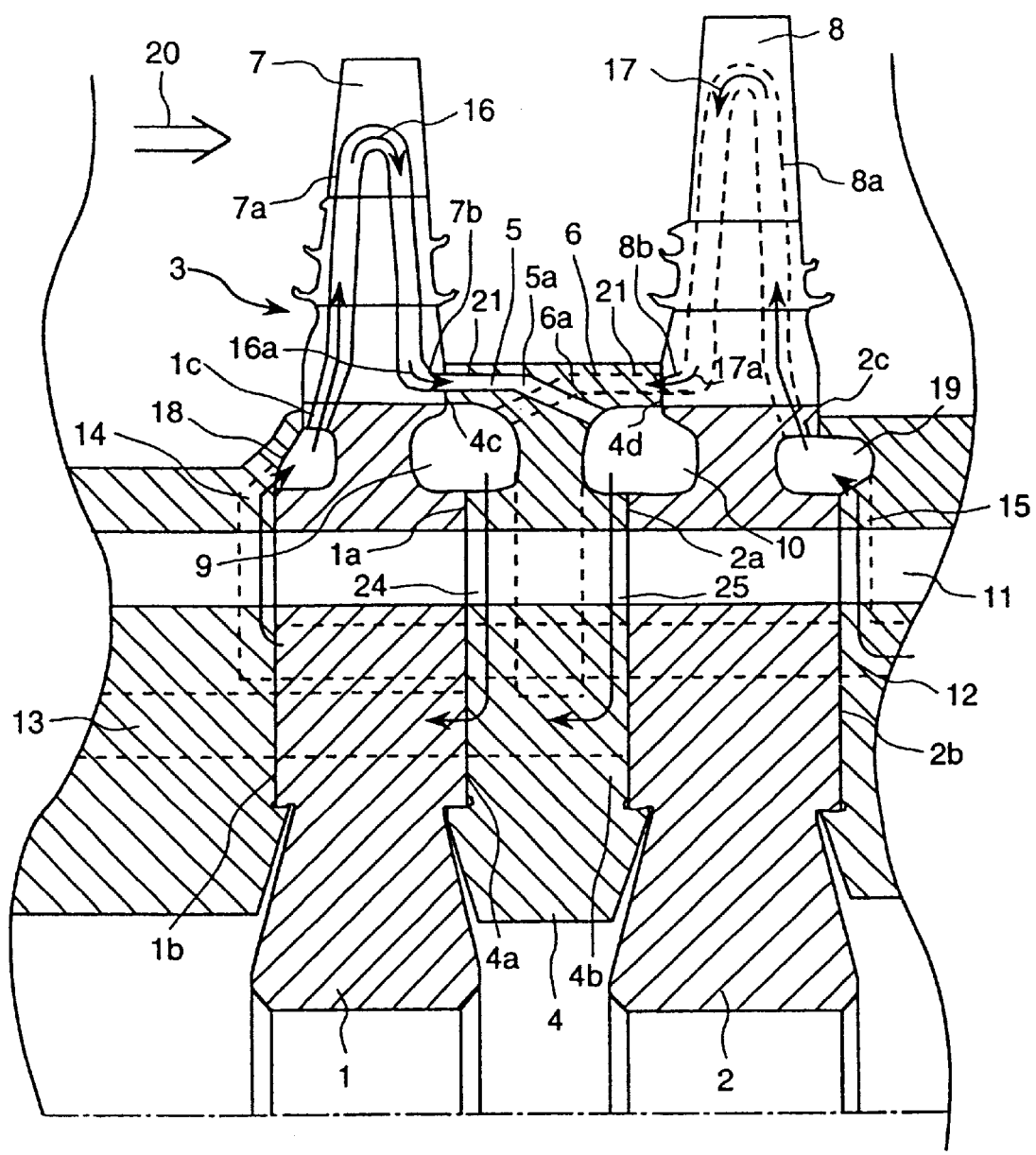
FIG. 1 is a view showing the first embodiment of a gas turbine apparatus of the present invention.

FIG. 1 shows a part of a section of a gas turbine apparatus of a first embodiment of the present invention in the axial direction of a turbine rotor.

The constitution of the gas turbine apparatus relating to the first embodiment will be described hereunder, referring to FIGS. 1 to 3.

In a turbine rotor 3, from the upstream side of gas flow along the longitudinal direction of the rotating shaft, a disk-shaped first stage wheel 1, a circular first stage spacer member 4, and a disc-shaped second stage wheel 2 are sequentially arranged and the wheels 1 and 2 and the spacer member 4 are mutually connected and integrated by bolts 11 passing through them. Namely, between the first stage wheel 1 and the second stage wheel 2 which are neighboring wheels among a plurality of wheels, the spacer member 4 is arranged. When the wheels are taken into account, the first stage wheel 1 and the second stage wheel 2 are neighboring with each other. "Neighboring" of the wheels which is referred to as here means "adjacent" and actually, they may be in contact with each other or not.

In the outer periphery of the first stage wheel 1, a plurality of first stage moving blades 7 each having a cooling path 7a inside respectively are installed in a ring-shape and in the same way, in the outer periphery of the second stage wheel 2, a plurality of second stage moving blades 8 each having a cooling path 8a inside respectively are installed in a ring-shape.

The first stage spacer member 4 has flow paths 5 and 6 inside through which a refrigerant after cooling the moving blades passes.

In a junction surface 1a of the first stage spacer member 4 and the first stage wheel 1 positioned on the upstream side of gas flow of the first stage spacer member 4, a hollowed refrigerant collection cavity 9 on the upstream side is formed and in a junction surface 2a of the first stage spacer member 4 and the second stage wheel 2 positioned on the downstream side of gas flow of the first stage spacer member 4, a hollowed refrigerant collection cavity 10 on the downstream side is also formed.

The flow paths 5 for letting a refrigerant after cooling the moving blades flow, each of which is installed in the first stage spacer member 4, interconnect the cooling paths 7a installed in the first stage moving blades 7 on the upstream side of gas flow and the refrigerant collection cavity 10 on the downstream side, respectively and the flow paths 6 interconnect the cooling paths 8a installed in the second stage moving blades 8 on the downstream side of gas flow and the refrigerant collection cavity 9 on the upstream side, respectively.

The flow paths 5 and 6 have, in the positions slightly close to the center of the spacer member 4 from spacer arms 21, bent parts 5a and 6a and are formed so as to extend in parallel with the rotating shaft between the connection of the moving blades and the spacer member 4 and the bent parts 5a and 6a.

The flow paths 5 and 6 between the bent parts 5a and 6a and the refrigerant collection cavities 9 and 10 each take the configuration passing through linearly as shown in FIG. 1. However, it may be formed in a curved shape and it may be decided in consideration of the workability.

In this case, the spacer arms 21 are the parts where in the outer periphery of the first stage spacer member 4, the refrigerant collection cavities 9 and 10 are formed on the inner periphery side thereof.

On a side 1b of the first stage wheel 1 on the upstream side of gas flow, a hollowed refrigerant supply cavity 18 is formed and in the same way, on a side 2b of the second stage wheel 2 on the downstream side of gas flow, a hollowed refrigerant supply cavity 19 is formed. The refrigerant supply cavity 18 is interconnected to the cooling paths 7a of the moving blades 7 via a path 1c inside the first stage wheel 1 and the refrigerant supply cavity 19 is interconnected to the cooling paths 8a of the moving blades 8 via a path 2c inside the second stage wheel 2.

According to this embodiment, the parts referred to as the refrigerant supply cavities 18 and 19 or the refrigerant collection cavities 9 and 10 represent spaces or flow paths for distributing or collecting a refrigerant for each moving blade. The refrigerant supply cavities 18 and 19 and the refrigerant collection cavities 9 and 10 each may be formed as one space or flow path along the overall periphery in the circumferential direction of the turbine rotor 3 or may be divided into some parts.

Around the rotating shaft on the inner periphery side from the refrigerant supply cavities 18 and 19 or the refrigerant collection cavities 9 and 10 of the turbine rotor 3, a plurality of refrigerant supply pipes 12 and a plurality of refrigerant collection pipes 13 are independently arranged.

The refrigerant supply pipes 12 pass through the first stage wheel 1, the first stage spacer 4, and the second stage wheel 2 and a refrigerant introduced from other than the turbine rotor system passes through the second stage wheel 2, the first stage spacer 4, and the first stage wheel 1 sequentially from the downstream side of gas flow.

On the side 1b of the first stage wheel 1 on the upstream side of gas flow and the side 2b of the second stage wheel 2 on the downstream side of gas flow, refrigerant supply slits 14 and 15 are formed respectively and interconnect the refrigerant supply pipe 12 to the refrigerant supply cavities 18 and 19. If the refrigerant supply slits 14 and 15 practically introduce a refrigerant distributed from the refrigerant supply pipe 12 to the refrigerant supply cavities 18 and 19, any shape and number of slits can be taken.

If the refrigerant supply pipe 12 can practically distribute a refrigerant introduced from other than the turbine rotor system to the refrigerant supply slits 14 and 15, the arrangement in the turbine rotor, the shape and number of pipes, and the number of wheels and spacer members through which a refrigerant passes are no particular object. For example, a refrigerant may be introduced from the upstream side of gas flow of the turbine rotor 3 and may pass through sequentially the first stage wheel 1, the first stage spacer 4, and the second stage wheel 2.

A plurality of the refrigerant supply pipes 12 may be interconnected to both or either of the refrigerant supply slits 14 and 15 according to the flow rate of a refrigerant to be supplied to the moving blades 7 and 8 from the wheels 1 and 2.

The refrigerant collection pipe 13 passes through the first stage wheel 1 and the first stage spacer member 4 and introduces a collection refrigerant after cooling the moving blades to other than the turbine rotor system from the upstream side of gas flow of the turbine rotor 3.

On a side 4a of the first stage spacer member 4 on the upstream side of gas flow and a side 4b on the downstream side of gas flow, refrigerant collection slits 24 and 25 are formed respectively and interconnect the refrigerant collection cavities 9 and 10 to the refrigerant collection pipe 13. If the refrigerant collection slits 24 and 25 practically introduce collected refrigerants 17a and 16a after cooling the moving blades from the refrigerant supply cavities 18 and 19 to the refrigerant collection pipe 13, the shape and number of slits are no particular object.

If the refrigerant collection pipe 13 can practicaily collect the refrigerants 16a and 17a after cooling the moving blades from the refrigerant collection slits 24 and 25 and introduce them outside the turbine rotor system, in the same way as with the refrigerant supply pipe 12, the arrangement in the turbine rotor, the shape and number of pipes, and the numbers of wheels and space members through which a refrigerant passes are no particular object. For example, a refrigerant may flow through sequentially the first stage spacer member 4 and the second stage wheel 2 and may be introduced outside the turbine rotor system from the downstream side of gas flow of the turbine rotor 3.

A plurality of refrigerant collection pipes 13 may be interconnected to both or either of the refrigerant collection slits 24 and 25 according to the flow rate of a refrigerant to be collected from the moving blades 7 and 8 of the wheels 1 and 2.

Figure 2:
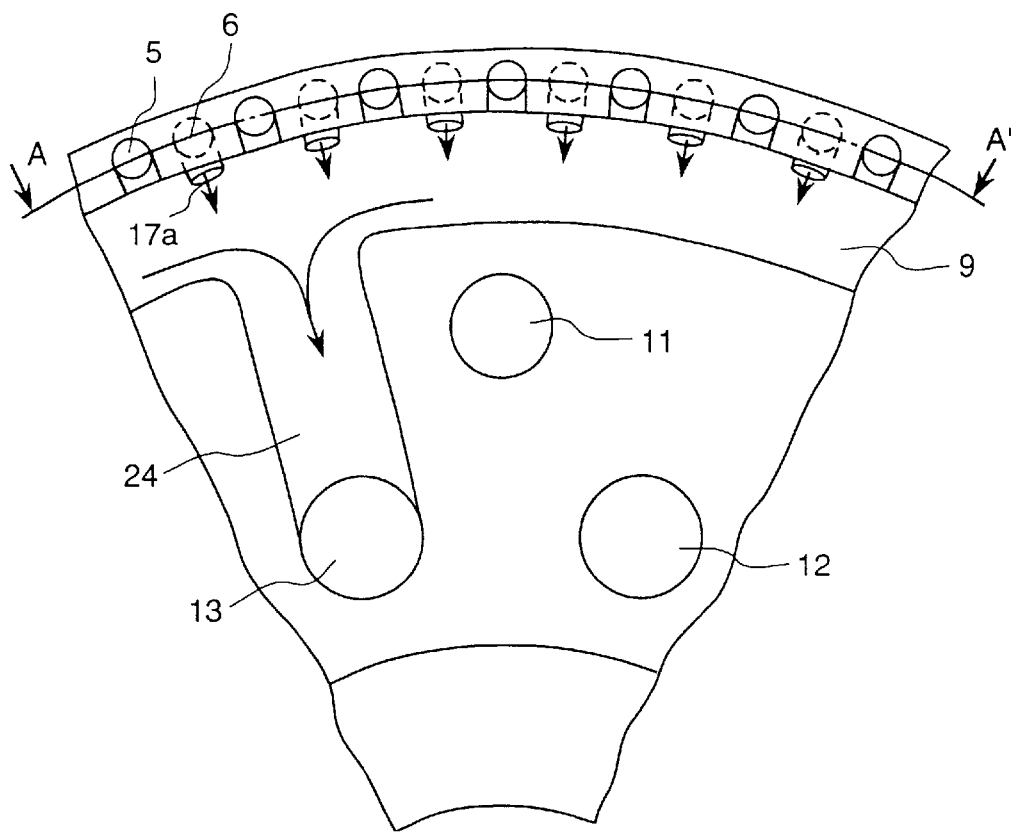
FIG. 2 is a view of the spacer member of the first embodiment which is viewed from the front of the rotation axis.
Figure 3:
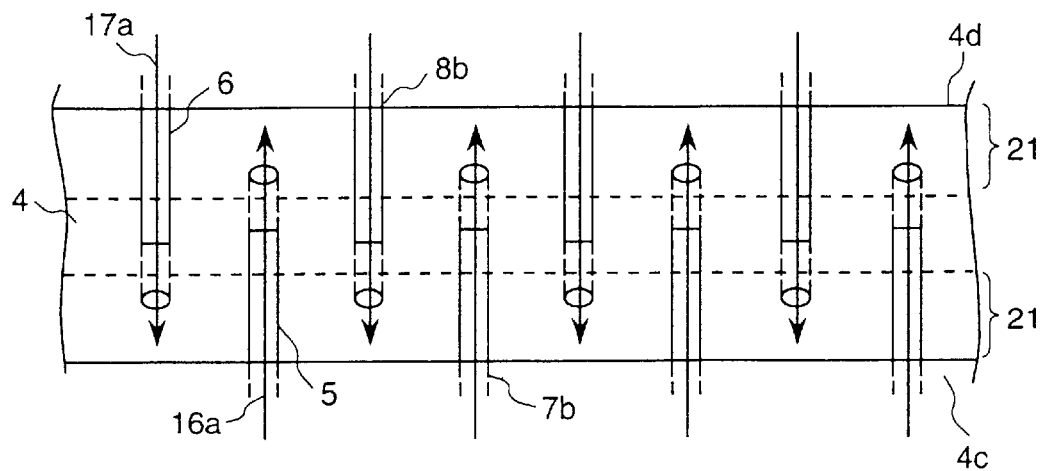
FIG. 3 is a view of the spacer member of the first embodiment which is developed from the outer periphery surface.

The constitution of the gas turbine apparatus of this embodiment will be supplementally explained additionally by referring to FIGS. 2 and 3.

FIG. 2 shows a part of the first stage spacer member 4 of the gas turbine apparatus shown in FIG. 1 which is viewed from the upstream side of the revolving shaft.

A plurality of flow paths 5 and 6 are installed alternately and independently in the outer periphery of the spacer member 4 and arranged for each moving blade so that the flow paths 5 are connected to the cooling path outlet 7b of the first stage moving blades 7 and the flow paths 6 are connected to the cooling path outlet 8b of the second stage moving blades 8.

The flow paths 5 are interconnected to the refrigerant collection cavity 10 installed in the outer periphery of the first stage spacer member 4 corresponding on the back side of the sheet of FIG. 2 and the flow paths 6 are interconnected to the refrigerant collection cavity 9 installed in the outer periphery of the first stage spacer member 4.

The refrigerant collection cavity 9 may be formed along the overall periphery in the circumferential direction of the first stage spacer member 4 or may be divided into some parts.

The refrigerant collection slit 24 is formed on the side of the first stage spacer member 4 in the radial direction and interconnects the refrigerant collection cavity 9 to the refrigerant collection pipe 13 installed around the revolving shaft of the turbine rotor 3.

Around the revolving shaft of the turbine rotor 3, the bolt 11, the refrigerant supply pipes 12, and the refrigerant collection pipes 13 are arranged independently and a plurality of first stage spacer members 4 are installed respectively.

FIG. 3 is the section A–A' shown in FIG. 2 which is developed in a plane shape viewed from the outer periphery of the spacers. The refrigerant collection paths 5 and 6 are formed alternately and linearly and do not intersect each other inside the spacers.

Next, the flow of a refrigerant for cooling the moving blades of the gas turbine apparatus of this embodiment will be explained hereunder. In this embodiment, an example using compressed air extracted from the compressor of the gas turbine apparatus as a refrigerant is indicated.

A refrigerant extracted from a compressor 30 (refer to FIG. 8 for example) passes through an extracted air refrigerant path 36 (refer to FIG. 8 for example) outside the turbine rotor system and is introduced into a plurality of refrigerant supply pipes 12 installed around the revolving shaft of the turbine rotor. A refrigerant introduced into the refrigerant supply pipes 12 is distributed to a plurality of refrigerant supply slits 14 and 15 formed in the side 1b on the upstream side of gas flow of the first stage wheel 1 and the side 2b on the downstream side of gas flow of the second stage wheel 2.

Refrigerants passing through the refrigerant supply slits 14 and 15 are distributed in the circumferential direction of the turbine rotor 3 in the refrigerant supply cavities 18 and 19. Then, they pass through the path 1c of the first stage wheel 1 and the path 2c of the second stage wheel 2 and are introduced into the cooling paths 7a and 8a of the moving blades 7 and 8 installed in the outer peripheries of the first stage wheel 1 and the second stage wheel 2.

The flow of refrigerants in the moving blades 7 and 8 is respectively represented by arrows 16 and 17 shown in FIG. 1 and at this time, the refrigerants cool the moving blades 7 and 8 getting high in temperature by combustion gas flowing outside.

The refrigerants 16a and 17a after cooling the moving blades are respectively introduced into the flow paths 5 and 6 independently installed in the first stage spacer member 4 from the moving blades 7 and 8. In this case, the refrigerant 16a having cooled the first stage moving blades 7 is introduced into the flow path 5 and the refrigerant 17a having cooled the second stage moving blades 8 is introduced into the flow path 6.

The refrigerant 16a passing through the flow paths 5 is introduced to the refrigerant collection cavity 10 on the downstream side and the refrigerant 17a passing through the flow paths 6 is introduced to the refrigerant collection cavity 9 on the upstream side.

Furthermore, the refrigerants 16a and 17a flow into the refrigerant collection pipes 13 arranged around the rotating shaft of the turbine rotor 3 via a plurality of refrigerant collection slits 24 and 25 formed in the sides 4a and 4b of the first stage spacer member 4 in the radial direction from the refrigerant collection cavity 10 on the downstream side and the refrigerant collection cavity 9 on the upstream side. The refrigerants reached the refrigerant collection pipes 13 are introduced outside the turbine rotor system and supplied to combustion air of the combustor 31(refer to FIG. 8 for example) finally via a collection refrigerant path 37 (refer to FIG. 8 for example) installed outside the turbine rotor system.

The effects obtained by the actual operation using the aforementioned constitution of this embodiment will be explained hereunder.

The first effect of this embodiment is that reliable wheels can be obtained based on the stress by the centrifugal force caused by the rotation of the gas turbine.

As the gas turbine increases in rotation, the centrifugal force acting on the first stage wheel 1, the second stage wheel 2, and the first stage spacer member 4 constituting the turbine rotor 3 increases. Since the wheels particularly have the moving blades 7 and 8 planted therein, remarkable stress is acted on the outer periphery of each of the wheels.

If the outer peripheries of the wheels 1 and 2 are structured so as to have many refrigerant flow paths, no sufficient strength can be obtained and there is the possibility that the stress is concentrated on the peripheral part of the refrigerant flow path. Furthermore, when there is a flow path of a refrigerant having become high in temperature after cooling the moving blades, the refrigerant directly comes in contact with the wheels to raise the temperature of the wheels, so that it is necessary to consider the allowable stress of the wheels.

According to this embodiment, since the refrigerant flow paths installed in the first stage wheel 1 and the second stage wheel 2 are only the paths 1c and 2c of a refrigerant at a low temperature before cooling the moving blades, the structure is simple and the effect on a reduction in the allowable stress of the wheel member due to temperature rise is small and hence wheels high in strength and reliable on the stress due to centrifugal force and thermal stress can be obtained.

The second effect of this embodiment is that a reliable spacer member can be obtained for the stress by the centrifugal force caused by the rotation of the gas turbine.

As the centrifugal force caused by the rotation of the gas turbine increases, on the spacer arms 21 of the first stage spacer member 4 shown in FIGS. 1 and 3, bending stress is generated outward in the radial direction and as the number of revolutions increases, the bending stress increases, so that it is necessary to consider this stress.

On the other hand, according to this embodiment, on the bent parts 5a and 6a of the flow paths installed in the spacer member 4, bending stress is not easy to act because they are not on the spacer arms 21 and the stress acting on the bent parts of the flow paths reduces. The radius of curvature at the bent parts 5a and 6a of the flow paths is larger than that when, for example, the cooling paths 7a of the first stage moving blades 7 are interconnected to the refrigerant collection cavity 9 on the upstream side and the cooling paths 8a of the second stage moving blades 8 are interconnected to the refrigerant collection cavity 10 on the downstream side. As a result, the stress concentration is moderated. Therefore, not only for the first stage wheel 1 and the second stage wheel 2 but also for the first stage spacer member 4, the reliability for the stress by the centrifugal force caused by the rotation of the gas turbine is high.

The third effect of this embodiment is that the sealing property at the connection of the cooling paths in the moving blades and the refrigerant flow paths installed in the spacer member is high.

As mentioned above, when a refrigerant leaks in combustion gas, the combustion gas temperature lowers and the turbine efficiency reduces, so that it is necessary to keep the sealing property at the connection with the refrigerant flow paths high. Particularly since the turbine rotor rotates at high speed at a high temperature, it is important to take a shape that deformation due to heat and centrifugal force under the actual operation condition is not easily caused and the sealing property is high.

If the refrigerant path outlets 7b and 8b of the moving blades 7 and 8 directly face the space having a spread of the refrigerant collection cavities 9 and 10, peripheries 4c and 4d of the spacer member 4 in contact with the moving blades 7 and 8 have lower structural strength and the deformation due to centrifugal force is easily increased. Furthermore, the contact area of the moving blades with the spacer member 4 is small and it is necessary to consider leakage of a refrigerant from the peripheries 4c and 4d of the spacer member 4.

Therefore, in the aforementioned embodiment or the present invention, the flow paths 5 and 6 of a refrigerant after cooling the moving blades installed in the space member 4 are independently installed at each of the moving blades cooling path outlets 7b and 8b, so that the strength of the peripheries 4c and 4d in contact with the moving blades of the spacer member 4 is high and the deformation due to centrifugal force can be made smaller. Furthermore, since the contact area of the moving blades 7 and 8 with the spacer member 4 is large, the sealing property at the connection of the moving blades cooling path outlets 7b and 8b with the flow paths 5 and 6 installed in the spacer member 4 can be kept high.

In addition, this embodiment produces an effect such that the effect of heat on the strength of the wheels can be reduced. Namely, since there are no flow paths of a refrigerant having high in temperature after cooling the moving blades in the wheels, the wheels cannot be easily heated, and the reduction in the allowable stress due to temperature rise is suppressed, and the strength can be kept high. At the same time, the temperature incline between the high-temperature portion and the low-temperature portion in the wheel member is not easily increased, so that the effect of the thermal stress acting on the wheels can be reduced.

As mentioned above, according to this embodiment, high-strength wheels can be obtained and the stress concentration due to the centrifugal force acting on the wheels and spacer member can be reduced, so that a reliable gas turbine can be provided. Furthermore, the sealing property at the connection of the moving blades cooling paths with the flow paths installed in the spacer member can be improved, so that the refrigerant leakage is suppressed and the high efficiency can be realized.

Figure 4:
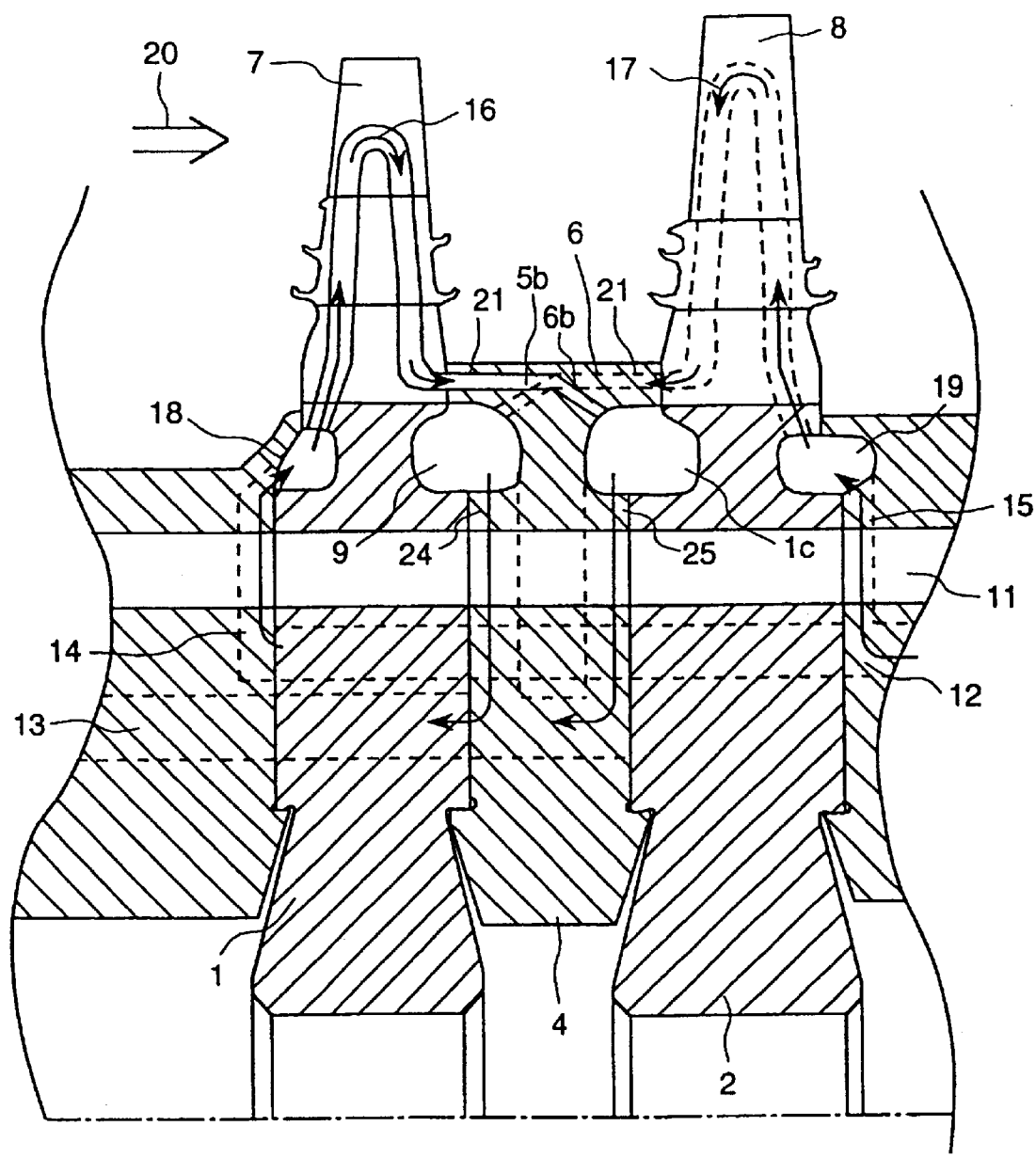
FIG. 4 is a view showing another embodiment of a gas turbine apparatus of the present invention.

FIG. 4 shows a part of the section of a gas turbine apparatus of the second embodiment of the present invention in the axial direction of the turbine rotor. The explanation of the constitution and operation common to those of the first embodiment will be omitted.

According to this embodiment, the bent parts 5b and 6b of the flow paths 5 and 6 installed in the spacer member 4 are formed in the neighborhood of the center of the spacer member 4 in the axial direction.

The neighborhood of center of the spacer member 4 in the axial direction is a location which is most hard to be adversely affected by the bending stress acting on the spacer arms 21 by the centrifugal force, so that the stress acting on the neighborhood of the bent part is made smaller. Therefore, no stress concentration is generated in the neighborhood of the bending part of each of the flow paths and there is an advantage that a reliable spacer member can be obtained for the stress due to the centrifugal force.

Figure 5:
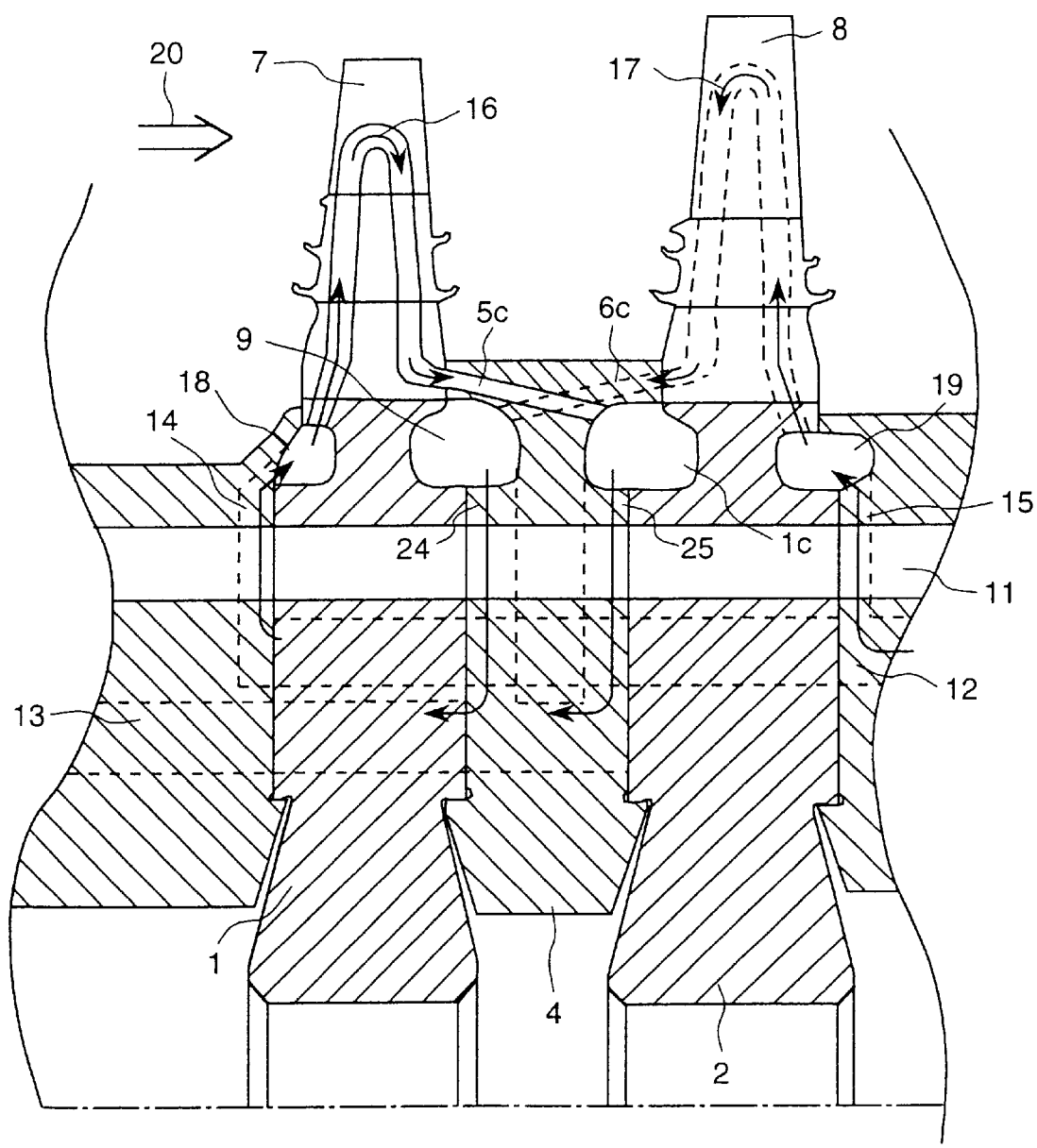
FIG. 5 is a view showing still another embodiment of a gas turbine apparatus of the present invention.

FIG. 5 shows a part of the section of a gas turbine apparatus of the third embodiment of the present invention in the axial direction of the turbine rotor. The explanation of the constitution and operation common to those of the first embodiment will be omitted.

In this embodiment, the flow paths 5c and 6c installed in the spacer member 4 are arranged generally linearly.

Therefore, there are no bent parts in the flow paths, so that no stress concentration is generated at a specific part of the flow paths and a reliable spacer member can be obtained for the stress due to the centrifugal force.

Figure 6:
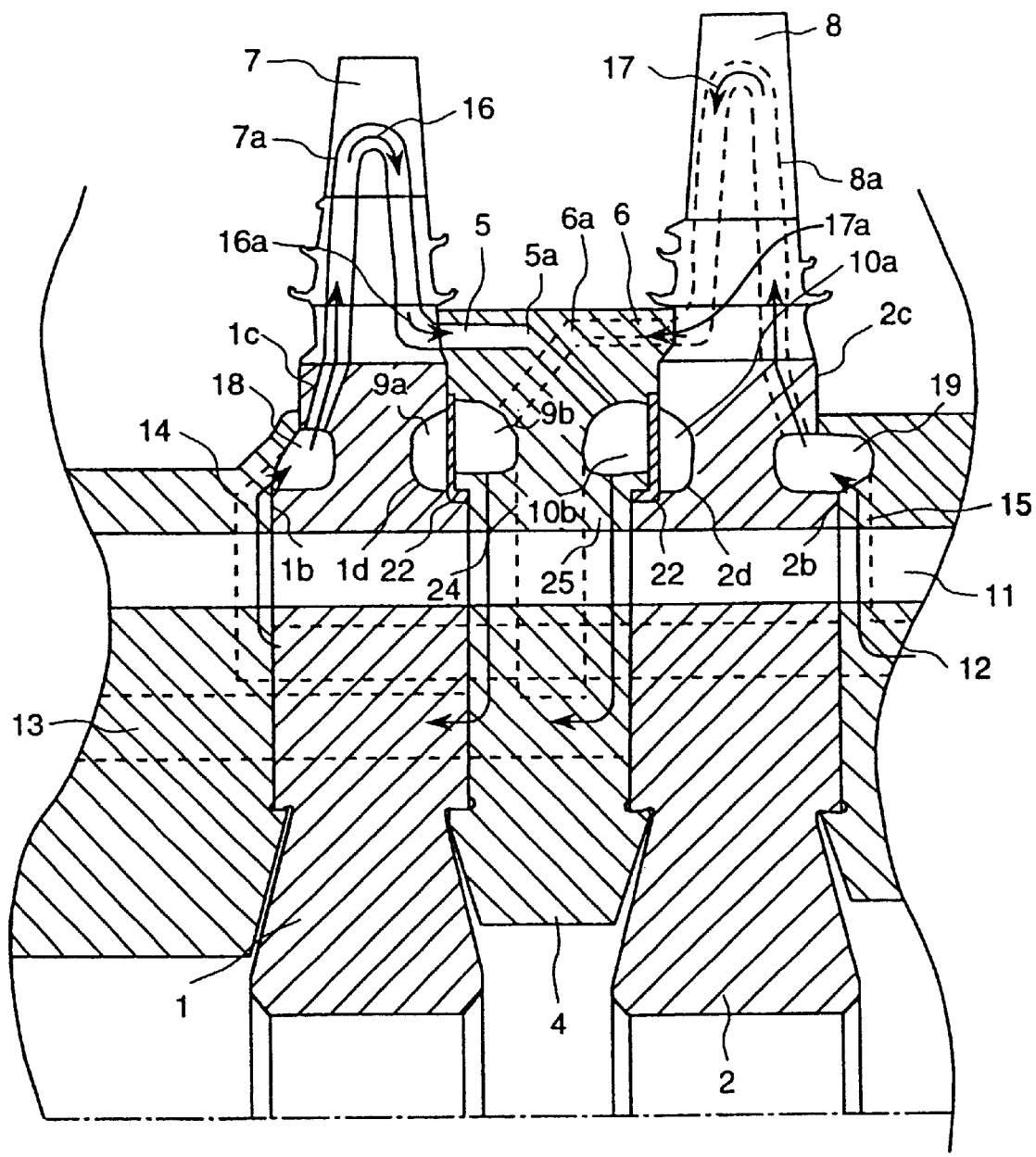
FIG. 6 is a view showing a further embodiment of a gas turbine apparatus of the present invention.

FIG. 6 shows a part of the section of a gas turbine apparatus of the fourth embodiment of the present invention in the axial direction of the turbine rotor. The explanation of the constitution and operation common to those of the first embodiment will be omitted.

In this embodiment, spacers 22 are arranged so as to divide the refrigerant collection cavities 9 and 10 into spaces 9b and 10b on the side of the first stage spacer 4 and spaces 9a and 10a on the side of the first stage wheel 1 and the second stage wheel 2 in the overall circumferential direction.

When a high temperature refrigerant after cooling the moving blades is directly blown onto refrigerant collection cavity surfaces 1d and 2d of the wheels 1 and 2 and the temperature rises, the allowable stress of the wheel member reduces and hence the strength is easily decreased. Between the comparatively lower-temperature refrigerant supply cavities 18 and 19 installed on the opposite sides 1b and 2b of the wheels 1 and 2, a temperature difference is generated and great thermal stress is easily generated in the wheels. The parts with the wheel cavities formed are in the outer peripheries of the wheels and the moving blades are installed there, so that there are locations having large stress due to centrifugal force. As a result, the thermal effect and the effect of stress due to centrifugal force are overlaid, so that it is necessary to consider the reliability.

Therefore, in this embodiment, the spacer plates 22 isolate the refrigerant collection cavity surfaces 1d and 2d of the wheels 1 and 2 from the high temperature refrigerants 16a and 17a after cooling the moving blades and hence moderate the thermal effect on the wheels 1 and 2. Therefore, it can be prevented that the wheels 1 and 2 become warm and the allowable stress reduces and at the same time, the thermal stress acting on the wheels 1 and 2 can be reduced, so that the reliability of the wheels 1 and 2 is improved more.

If on the junction surface of the wheels 1 and 2 with the spacer member 4, the refrigerant collection cavities 9 and 10 are entirely divided into the spaces 9a and 10a on the wheel side and the spaces 9b and 10b on the spacer member side respectively by the spacer plates 22, the shape of the spacer plates 22 is no particular object. For example, the spacer plates may be formed in a ring shape that the overall periphery is integrated or combined with some members. As a material of the spacer plates 22, a heat-resistant material is suited and the surface of a metallic material may be covered with a heat-resistant material such as ceramics or chrome carbide.

The fourth embodiment has a constitution that the refrigerant collection cavities 9 and 10 are divided by the spacer plates 22 and the cavity surfaces 1d and 2d of the wheels 1 and 2 are isolated from the high temperature refrigerants 17a and 16a after cooling the moving blades. However, in addition to it, a constitution that the surface of each member through which a high temperature refrigerant passes such as the cavity surfaces 1d and 2d of the wheels 1 and 2 and the surfaces of the refrigerant collection slits 24 and 25 is coated and insulated from heat may be used. In this case, as a coating material, a heat-resistant material such as ceramics or chrome carbide or a porous material is suited.

Figure 7:
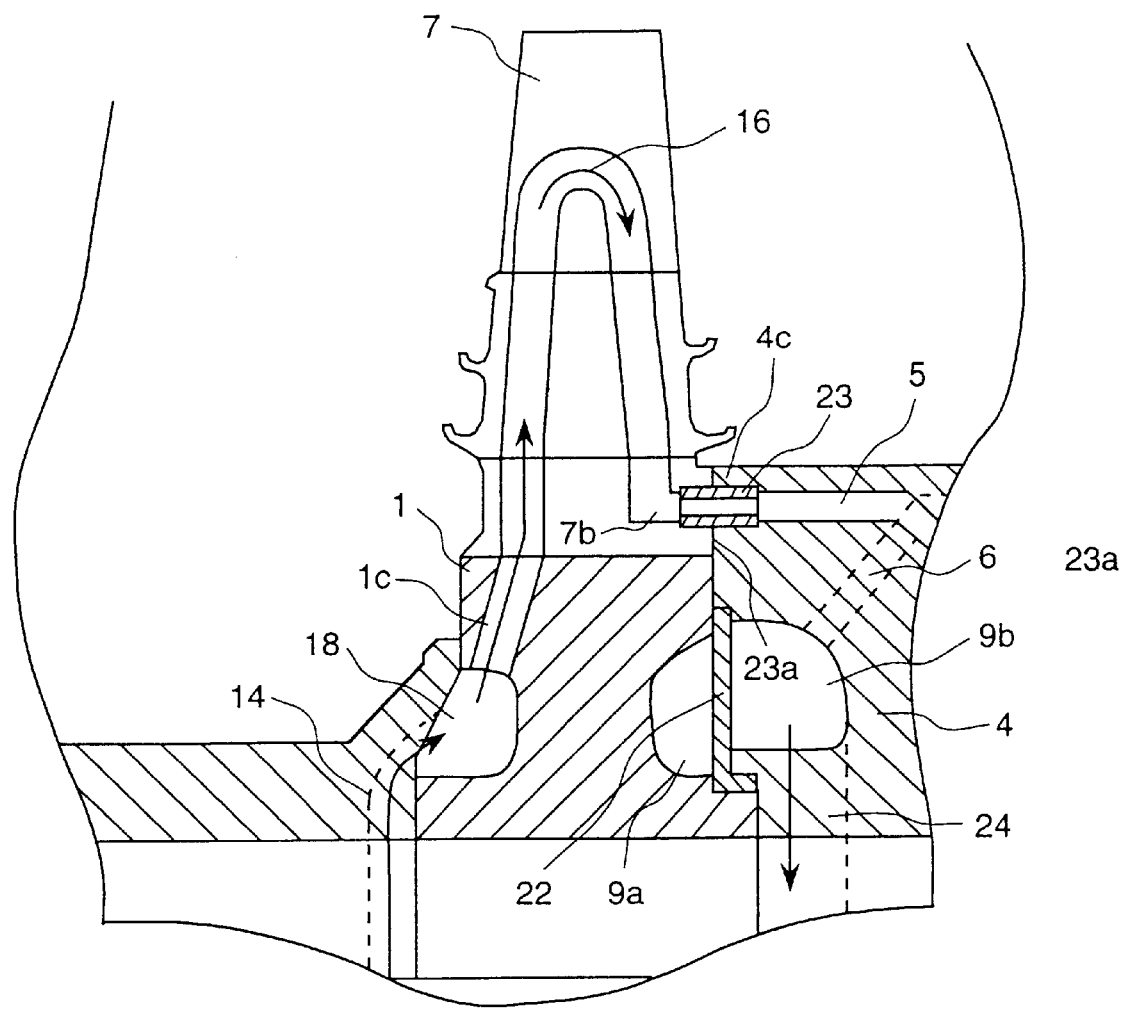
FIG. 7 is a view showing a still further embodiment of a gas turbine apparatus of the present invention.

FIG. 7 shows a part of the section of a gas turbine apparatus of the fifth embodiment of the present invention in the axial direction of the turbine rotor. The explanation of the constitution and operation common to those of the first to fourth embodiments will be omitted.

In this embodiment, at a connection 23a of the flow path 5 installed in the spacer member 4 and the cooling path outlet 7b of the moving blades 7, a sealing material 23 is installed. Also at the connection of the flow path 6 not shown in the drawing and the cooling path outlet 8b of the moving blades 8, a sealing material 23 is installed.

If the refrigerant path outlet of the moving blades directly faces the space having a spread of the refrigerant collection cavity, it is necessary to consider the sealing property in correspondence with the deformation of the moving blades and spacer member by heat or centrifugal force.

According to the first to fourth embodiments, the flow paths 5 and 6 installed in the spacer member 4 and the moving blades cooling path outlets 7b and 8b are formed so as to be interconnected in one-to-one correspondence, so that when the sealing member 23 is installed at the connection 23a as indicated in the fifth embodiment, the sealing property can be easily improved. Therefore, the leakage of a refrigerant can be prevented and the turbine efficiency can be kept high. This embodiment indicates an example that annular sealing materials 23 in accordance with the flow path 5 installed in the spacer member 4 and the opening shape of the cooling path outlet 7b of the moving blades 7 are inserted into a pair of connections 23a one by one. However, other methods are also available. For example, some annular sealing materials to be inserted into a pair of connections 23a may be integrated and if the sealing property can be practically exhibited, the shape and material thereof are no particular object.

Figure 8:
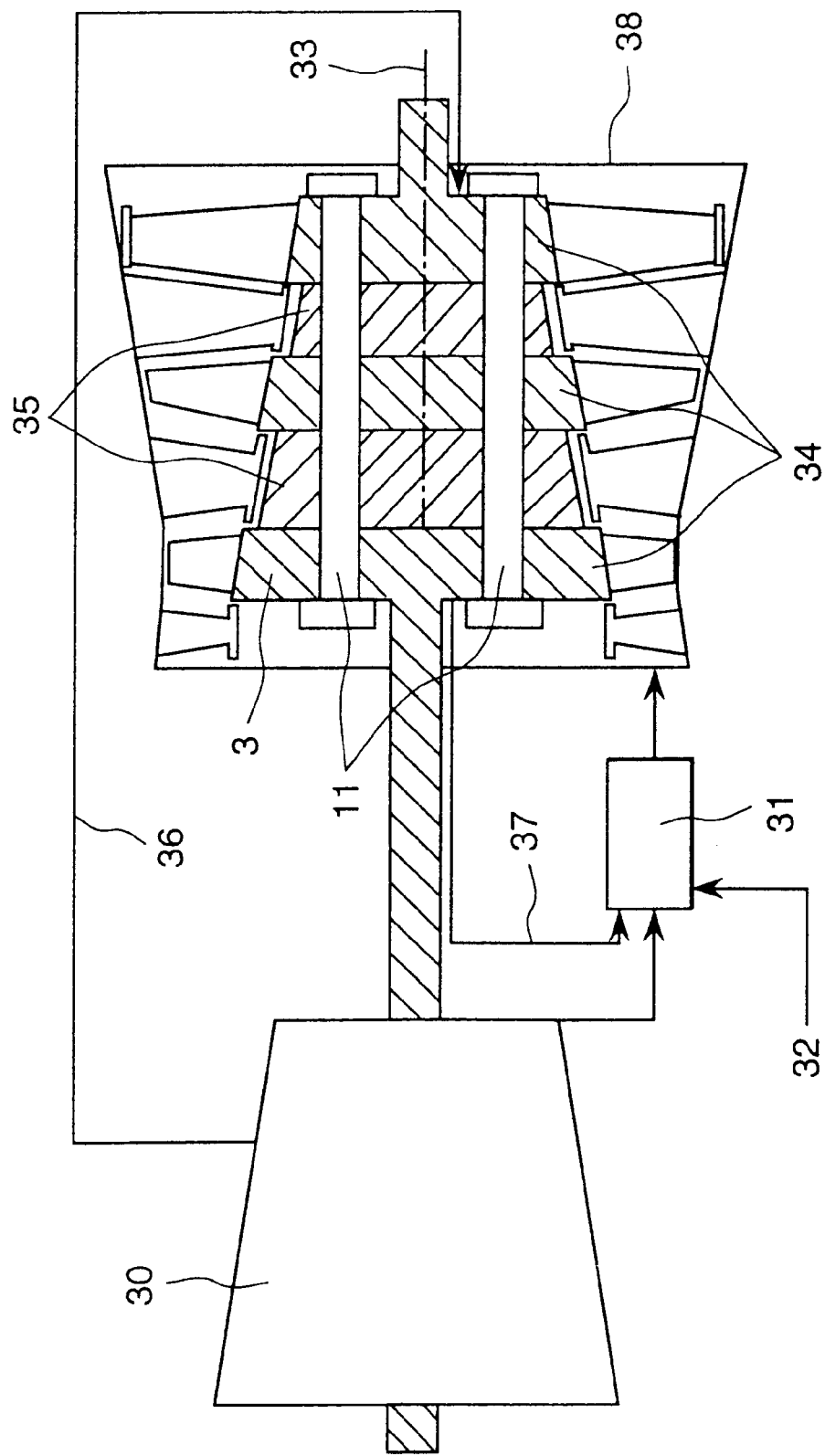
FIG. 8 is a schematic view of a gas turbine apparatus of the present invention.

FIG. 8 shows an embodiment of a gas turbine of the present invention. For the constitution and operation described in the previous embodiment, the explanation will be omitted.

The turbine rotor 3 that a plurality of wheels 34 and a plurality of spacer members 35 are integrated by bolts 11 and the compressor 30 are arranged on the center line 33 of the turbine, and fuel 32 is mixed with combustion air compressed by the compressor 30 by the combustor 31, and obtained high temperature combustion gas is introduced into the turbine 38.

According to this embodiment, compressed air taken out from the compressor 30 is introduced into the turbine rotor system via the extraction refrigerant path 36 and used as a moving blade cooling refrigerant.

The extraction refrigerant path 36 is connected to the refrigerant supply pipes 12 in the turbine rotor system and compressed air is supplied to the moving blade cooling paths 7a and 8a via the paths described in the first to fifth embodiments.

Compressed air collected in the turbine rotor system after cooling the moving blades is introduced outside the turbine rotor system via the refrigerant collection paths 13 described in the first to fifth embodiments, sent to the combustor 31 via the collection refrigerant 37, and used as a part of combustion air.

By doing this, even if combustion gas becomes high in temperature, the moving blades can be sufficiently cooled and a refrigerant becoming warm by heat exchange can be used as a part of combustion air, so that an efficient gas turbine can be obtained.

As a refrigerant, in addition, a gaseous body such as vapor, nitrogen, and hydrogen and a liquid such as water can be considered and for example, vapor which is generated using exhaust heat of combustion of the gas turbine can be applied.

As mentioned above, according to the present invention, in a gas turbine that the combustion temperature is increased and realization of high efficiency is required, an effect that a reliable and efficient gas turbine can be realized for the stress due to the centrifugal force caused by rotation of the gas turbine can be produced.

What is claimed is:

1. A turbine rotor including a plurality of moving blades having cooling paths through which a refrigerant flows inside, a plurality of wheels having said moving blades mounted in the outer periphery thereof, and at least a spacer member installed between said wheels, wherein said spacer member has a plurality of flow paths through which a refrigerant flows after cooling said moving blades, and said plurality of flow paths have flow paths interconnecting to said cooling paths in said moving blades on a first wheel adjacent said spacer member and interconnecting to a downstream space formed on a side wall surface with which a second wheel adjacent said spacer member and said spacer member are in contact.

2. A turbine rotor according to claim 1, wherein said plurality of flow paths have further flow paths interconnecting to said cooling paths in said moving blades on said second wheel and interconnecting to a space formed on a side wall surface with which said first wheel and said spacer member are in contact, and wherein a refrigerant after cooling said moving blades on said first wheel flows into said space on a side of said second wheel, and a refrigerant after cooling said moving blades on said second wheel flows into said space on a side of said first wheel.

3. A turbine rotor including a plurality of moving blades having cooling paths through which a refrigerant flows inside, a plurality of wheels having said moving blades mounted in the outer periphery thereof, and at least a spacer member installed between said wheels, wherein said spacer member has a plurality of flow paths through which a refrigerant flows after cooling said moving blades, and said plurality of flow paths have flow paths interconnecting to said cooling paths in said moving blades on a first wheel adjacent said spacer member on an upstream side of gas flow in said turbine and a side of said spacer member on a downstream side of said gas flow and allowing a refrigerant to flow through said flow paths from said cooling paths in said moving blades on said first wheel to said side of said spacer member on the downstream side of said gas flow.

4. A turbine rotor according to claim 3, wherein said plurality of flow paths have further flow paths interconnecting to said cooling paths in said moving blades on said second wheel and interconnecting to a side of said spacer on a side of said first wheel, and wherein a refrigerant after cooing said moving blades on said first wheel flows into said side of said spacer on the side of said second wheel, and a refrigerant after cooling said moving blades on said second wheel flows into said side of said spacer member on the side of said first wheel.

5. A turbine rotor including a plurality of moving blades having cooling paths through which a refrigerant flows inside, a plurality of wheels having said moving blades mounted in the outer periphery thereof, and at least a spacer member installed between said wheels, wherein said spacer member has a plurality of flow paths through which a refrigerant flows after cooling said moving blades, said plurality of flow paths have first flow paths interconnecting to said cooling paths in said moving blades on a first wheel and a side of said spacer member on a downstream second wheel side, and second flow paths interconnecting to said cooling paths in said moving blades on a second wheel and a side of said spacer member on a first wheel side, and wherein interconnecting portions of said first flow paths to said side of said spacer member on the second wheel side are positioned downstream of interconnecting portions of said second flow paths to said side of said spacer member on the first wheel side, with respect to a gas flow direction.

* * * * *